Nov. 26, 1946.　　　C. H. COLE　　　2,411,776
DRILL JIG
Filed June 28, 1944

INVENTOR.
Charles H. Cole
BY Brown & Seward
ATTORNEYS

Patented Nov. 26, 1946

2,411,776

UNITED STATES PATENT OFFICE 2,411,776

DRILL JIG

Charles H. Cole, Leonia, N. J.

Application June 28, 1944, Serial No. 542,486

6 Claims. (Cl. 33—174)

This invention relates to a drill jig or template, and particularly to such a device which is adapted to facilitate the quick and accurate measurement of distances, as between centers of holes to be drilled in a work piece.

An object of the invention is to provide a device which can be used, without adjustment of any moving part, to measure a wide variety of distances in small steps between a minimum and a maximum.

Another object is to provide such a device which is simple and inexpensive to manufacture and is durable, accurate and easy to use.

A further object is to provide certain improvements in the form, construction and arrangement of the device whereby the above-named and other objects may effectively be attained.

A practical embodiment of the invention is shown in the accompanying drawing, in which Fig. 1 represents a top plan view of the jig;

Figures 1, 2:
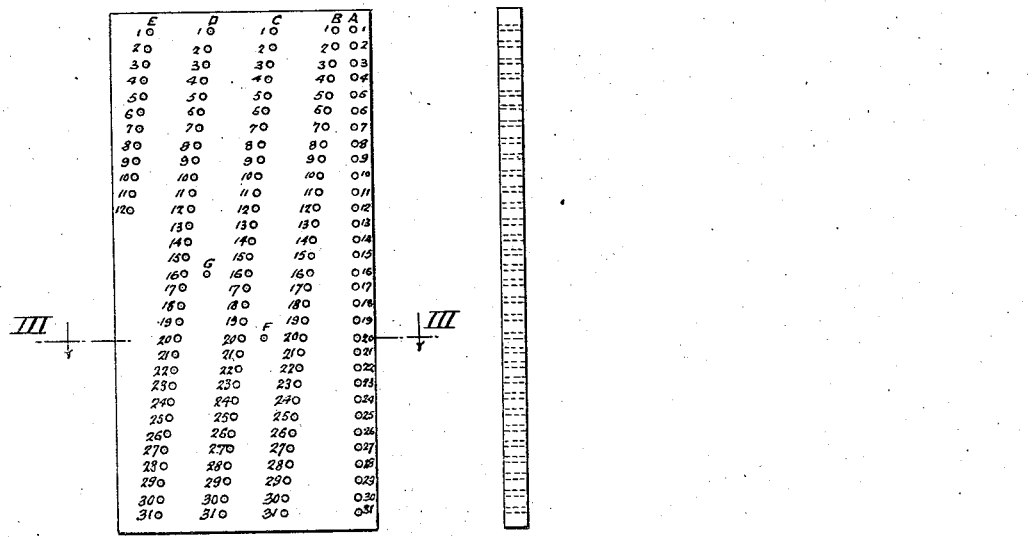
Fig. 2 represents a side elevation of the jig.
Figure 3:
Fig. 3 represents a transverse section taken along the line III—III of Fig. 1.

Referring to the drawing, the jig shown therein comprises a flat rectangular plate, preferably of a hard metal such as tool steel, hardened and ground so that its opposite surfaces are parallel and flat. This plate has drilled therein a plurality of rows of small holes, the rows being designated by the letters A, B, C, D and E, and the holes in each row being numbered sequentially for ready reference; the letters and numbers shown being stamped or otherwise applied to the surface of the plate. The holes are preferably uniform in size and are drilled accurately so that their axes are perpendicular to the surface of the plate and their centers spaced predetermined distances apart. In the jig shown the plate is 2" x 4", with a thickness of $\frac{3}{16}$"; this thickness could be reduced, for instance to $\frac{1}{16}$", if the jig is to be used only for drafting and layout work, while the full thickness is desirable when machine shop use (drill centering, etc.) is contemplated. The holes 1-31 in row A are spaced .1250" on centers, this row extending parallel to the long side of the plate. Row B starts with a hole B—1, which is .1250" from hole A—1 in a direction parallel to the short end of the plate, and continues with holes spaced increasing distances from the correspondingly numbered holes in row A until hole B—31 is reached at a distance of .5938" from hole A—31. Rows C and D lie parallel to row B, row C being .4844" from row B and row D being the same distance beyond row C, measured horizontally. Row E is correspondingly disposed but comprises only twelve holes.

From the foregoing it will be seen that distances in multiples of .1250" can be measured by the use of row A alone, from .1250" up to 3.7500". Distances from the same minimum up to 1.7500" in steps of .0156"+ can be measured by taking holes in row A and like numbered holes in rows B, C, D or E; while longer distances up to 4.0808" (E1—A31) can be measured along diagonals.

It is further provided that additional holes such as those marked F and G may be drilled in the plate at points which will permit the measurement of distances not accurately measurable between pairs of holes in the regularly disposed rows A to E. Since accuracy to four decimal places is normally sufficient, the arrangement shown is suitable for use within the limits indicated. The dimensions named are not intended to be critical, but rather to exemplify one form of the jig while other forms would include spacing of the holes in row A at distances of $\frac{1}{10}$" or in metric distances, the other rows being correspondingly modified.

The jig is intended to be used in connection with a reference table having distances arranged in regular sequence opposite notations of the holes to be used in measurement of such distances, as follows:

Distance table

| Dist. | Holes | Dist. | Holes | Dist. | Holes | Dist. | Holes |
|---|---|---|---|---|---|---|---|
| .1250 | B1—A1 | .6094 | C1—A1 | 1.0938 | D1—A1 | 1.5781 | E1—A1 |
| .1406 | B2—A2 | .6250 | C2—A2 | 1.1094 | D2—A2 | 1.5938 | E2—A2 |
| .1562 | B3—A3 | .6406 | C3—A3 | 1.1250 | D3—A3 | 1.6094 | E3—A3 |
| .1719 | B4—A4 | .6563 | C4—A4 | 1.1406 | D4—A4 | 1.6250 | E4—A4 |
| *.1767 | B1—A2 | .6719 | C5—A5 | *1.1547 | G—A16 | 1.6406 | E5—A5 |
| .1875 | B5—A5 | .6875 | C6—A6 | 1.1563 | D5—A5 | 1.6563 | E6—A6 |
| *.1881 | B2—A1/A3 | .7031 | C7—A7 | 1.1719 | D6—A6 | 1.6719 | E7—A7 |
| *.2000 | B3—A2/A4 | *.7071 | F—A20 | 1.1875 | D7—A7 | 1.6875 | E8—A8 |

| Dist. | Holes | Dist. | Holes | Dist. | Holes | Dist. | Holes |
|---|---|---|---|---|---|---|---|
| .5000 | B25—A25 | *.9767 | C24—A23/A25 | 1.4688 | D25—A25 | -------- | ---------- |
| *.5001 | B24—A23/A24 | .9844 | C25—A25 | 1.4531 | D24—A24 | -------- | ---------- |
| .5156 | B26—A26 | 1.0000 | C26—A26 | 1.4844 | D26—A26 | -------- | ---------- |
| .5313 | B27—A27 | 1.0156 | C27—A27 | 1.5000 | D27—A27 | -------- | ---------- |
| .5469 | B28—A28 | 1.0313 | C28—A28 | 1.5156 | D28—A28 | -------- | ---------- |
| .5625 | B29—A29 | 1.0469 | C29—A29 | 1.5313 | D29—A29 | -------- | ---------- |
| .5781 | B30—A30 | 1.0625 | C30—A30 | 1.5469 | D30—A30 | -------- | ---------- |
| .5938 | B31—A31 | 1.0781 | C31—A31 | 1.5625 | D31—A31 | *4.0808 | E1—A31 |

In the foregoing table the distances marked "*" are interpolated into the regular sequence, as for instance to meet the special requirements of a particular user, and other such distances may readily be calculated (trigonometrically or otherwise) and indicated as desired.

In a like manner, the jig may be used, in conjunction with a suitable table, to measure and lay out angles, one hole corresponding to the apex of the angle while the sides are located by selecting holes which correspond to points thereon. Such a table may include the following indications, given by way of example:

Angle table

| | |
|---|---|
| 4°32′ | A1—E1—A2 |
| 29°1′ | A1—E1—A8 |
| 41°38′ | A2—B2—A3 |
| 81°52′ | A1—B1—A8 |

The jig is used on machine work by passing a close-fitting drill or punch through the selected holes in order to mark, for instance, the centers for a further drilling operation; while in drafting work a pencil or other pointed device may be used for marking desired centers or other points.

It will be understood that various changes may be made in the form, construction and arrangement of the device without departing from the spirit and scope of the invention, and hence I do not intend to be limited to the details herein shown and described, except as they may be included in the claims.

What I claim is:

1. A device of the character described comprising a flat rectangular plate provided with a plurality of straight rows of holes, one of said rows being parallel to a side of the plate and the holes in said row being equally spaced, another row being adjacent to said first-named row and having its holes disposed at progressively varying distances, measured perpendicular to the line of the first row, from the holes in said first-named row, and at least one additional row parallel to said second-named row and having its holes disposed in the same manner.

2. A device according to claim 1 in which the distance between the farthest spaced corresponding holes in said first and second-named rows is less than the distance between the nearest spaced corresponding holes in the first-named row and the nearest additional row.

3. A device of the character described comprising a flat rectangular plate provided with a straight row of equally spaced holes of substantially equal diameters parallel to a side of the plate, and a plurality of additional rows of equally spaced holes parallel to each other and forming the same angle with the line of the first-named row, corresponding holes in the several rows being equally spaced from the ends of the plate.

4. A device according to claim 3 in which the difference in distances between any two adjacent holes in the first-named row and corresponding adjacent holes in any other row is the same as the difference in distances between any other two pairs of corresponding adjacent holes.

5. A device according to claim 3 in which the distance between the farthest spaced corresponding holes in the first-named row and any row other than the most distant row is less than the distance between the nearest spaced corresponding holes in the first-named row and the row next beyond the row to which said first-mentioned distance is measured.

6. A device according to claim 3 in which the distance between the farthest spaced corresponding holes in the first-named row and any row other than the most distant row is less than the distance between the nearest spaced corresponding holes in the first-named row and the row next beyond the row to which said first-mentioned distance is measured, the difference in said distances being the same as the difference in distances between adjacent holes in the first-named row and corresponding adjacent holes in any other row.

CHARLES H. COLE.